US009976093B2

United States Patent
Corscadden et al.

(10) Patent No.: US 9,976,093 B2
(45) Date of Patent: May 22, 2018

(54) SEPARATION OF SOLID ASPHALTENES FROM HEAVY LIQUID HYDROCARBONS USING NOVEL APPARATUS AND PROCESS ("IAS")

(71) Applicant: MEG ENERGY CORP., Calgary (CA)

(72) Inventors: Tom Corscadden, Calgary (CA); Jim Kearns, Calgary (CA); Greg Diduch, Calgary (CA); Damien Hocking, Calgary (CA); Darius Remesat, Calgary (CA)

(73) Assignee: MEG ENERGY CORP., Calgary (CA)

( * ) Notice: Subject to any disclaimer, the term of this patent is extended or adjusted under 35 U.S.C. 154(b) by 572 days.

(21) Appl. No.: 14/188,547

(22) Filed: Feb. 24, 2014

(65) Prior Publication Data

US 2014/0246357 A1 Sep. 4, 2014

Related U.S. Application Data

(60) Provisional application No. 61/768,870, filed on Feb. 25, 2013.

(51) Int. Cl.
*C10G 21/28* (2006.01)
*C10G 21/00* (2006.01)
(Continued)

(52) U.S. Cl.
CPC .......... *C10G 21/28* (2013.01); *B01D 11/0446* (2013.01); *B01D 11/0473* (2013.01);
(Continued)

(58) Field of Classification Search
CPC .............................. C10G 21/28; C10G 21/003
See application file for complete search history.

(56) References Cited

U.S. PATENT DOCUMENTS 2,451,433 A 10/1948 Davis
2,493,265 A 1/1950 Scheibel
(Continued)

FOREIGN PATENT DOCUMENTS

CA 2455149 A1 6/2004
CA 2764676 C 8/2012
(Continued)

OTHER PUBLICATIONS

Beuther et al., "Thermal Visbreaking of Heavy Residues", The Oil and Gas Journal. 57:46, Nov. 9, 1959, pp. 151-157.
(Continued)

*Primary Examiner* — Randy Boyer
*Assistant Examiner* — Juan C Valencia
(74) *Attorney, Agent, or Firm* — Bennett Jones LLP

(57) ABSTRACT

An apparatus and process is provided for improved asphaltene separation from heavy hydrocarbon or bitumen with low process complexity through mass transfer using solvent and counter-current flows, with three sections: an upper DAO/solid-asphaltene separation zone, a middle solvent mixing and segregation zone, and a bottom clarification zone. Solvent mixed with heavy hydrocarbon forms a process feed introduced to the process vessel's upper zone and exposed to counter-current solvent removing DAO from solid asphaltene particles in the feed, the particles fall through the middle zone and are mixed with introduced solvent, which introduced solvent segregates DAO-rich solution in the upper zone (for extraction from that zone) from solvent-rich mixtures in the middle mixing and lower clarification zones. Solvent flows and precipitate movement are controlled to optimize mass transfer in process, resulting in high DAO recovery and dry, solid asphaltene product.

15 Claims, 4 Drawing Sheets

(51) Int. Cl.
*C10G 21/30* (2006.01)
*B01D 11/04* (2006.01)

(52) U.S. Cl.
CPC ...... *B01D 11/0484* (2013.01); *B01D 11/0488* (2013.01); *C10G 21/003* (2013.01); *C10G 21/30* (2013.01)

(56) References Cited

U.S. PATENT DOCUMENTS

| | | |
|---|---|---|
| 2,850,431 A | 9/1958 | Smith |
| 2,950,244 A * | 8/1960 | Lawson, Jr. ......... C10G 21/003 208/309 |
| 3,005,769 A | 10/1961 | Garwin |
| 3,053,751 A | 9/1962 | Garwin |
| 3,318,804 A | 5/1967 | Van Pool et al. |
| 3,516,928 A | 6/1970 | King et al. |
| 3,714,033 A | 1/1973 | Somekh et al. |
| 3,714,034 A | 1/1973 | Kosseim et al. |
| 3,779,902 A | 12/1973 | Mitchell et al. |
| 3,811,843 A | 5/1974 | Morfit et al. |
| 3,847,751 A | 11/1974 | Godino et al. |
| 3,968,023 A | 7/1976 | Yan |
| 4,017,383 A | 4/1977 | Beavon |
| 4,062,758 A | 12/1977 | Goudriaan et al. |
| 4,088,540 A | 5/1978 | Bunas |
| 4,101,415 A | 7/1978 | Crowley et al. |
| 4,125,458 A | 11/1978 | Bushnell et al. |
| 4,191,636 A | 3/1980 | Fukui et al. |
| 4,200,525 A | 4/1980 | Karr |
| 4,233,138 A | 11/1980 | Rollmann et al. |
| 4,239,616 A | 12/1980 | Gearhart |
| 4,260,476 A | 4/1981 | Vidueira et al. |
| 4,278,529 A | 7/1981 | Gearhart |
| 4,389,302 A | 6/1983 | Garwin et al. |
| 4,421,639 A | 12/1983 | Lambert et al. |
| 4,428,824 A | 1/1984 | Choi et al. |
| 4,454,023 A | 6/1984 | Lutz |
| 4,455,216 A * | 6/1984 | Angevine ................ C10G 1/04 208/390 |
| 4,482,453 A | 11/1984 | Coombs et al. |
| 4,528,100 A | 7/1985 | Zarchy |
| 4,530,754 A | 7/1985 | Shiroto et al. |
| 4,548,711 A | 10/1985 | Coombs et al. |
| 4,572,781 A | 2/1986 | Krasuk et al. |
| 4,640,762 A | 2/1987 | Woods et al. |
| 4,673,485 A | 6/1987 | Bristow et al. |
| 4,686,028 A | 8/1987 | Van Driesen et al. |
| 4,767,521 A | 8/1988 | Feldman et al. |
| 4,773,986 A | 9/1988 | Feldman et al. |
| 4,778,586 A | 10/1988 | Bain et al. |
| 4,810,367 A | 3/1989 | Chombart et al. |
| 4,818,371 A | 4/1989 | Bain et al. |
| 4,846,958 A | 7/1989 | Feldman et al. |
| 4,882,035 A | 11/1989 | Loutaty et al. |
| 4,940,529 A | 7/1990 | Beaton et al. |
| 4,994,172 A | 2/1991 | Buchanan et al. |
| 5,008,085 A | 4/1991 | Bain et al. |
| 5,009,772 A | 4/1991 | Nelson et al. |
| 5,013,427 A | 5/1991 | Mosby et al. |
| 5,092,983 A * | 3/1992 | Eppig ..................... B01D 11/02 208/13 |
| 5,124,025 A | 6/1992 | Kolstad et al. |
| 5,124,026 A | 6/1992 | Taylor et al. |
| 5,124,027 A | 6/1992 | Beaton et al. |
| 5,188,709 A | 2/1993 | Kuerston et al. |
| 5,192,421 A | 3/1993 | Audeh et al. |
| 5,228,978 A | 7/1993 | Taylor et al. |
| 5,242,578 A | 9/1993 | Taylor et al. |
| 5,258,117 A | 11/1993 | Kolstad et al. |
| 5,601,697 A | 2/1997 | Miller et al. |
| 5,635,055 A | 6/1997 | Sweet et al. |
| 5,667,686 A | 9/1997 | Schubert |
| 5,795,464 A | 8/1998 | Sankey et al. |
| 5,919,355 A | 7/1999 | Hood |
| 5,932,090 A | 8/1999 | Marachionna et al. |
| 5,976,360 A | 11/1999 | Blum et al. |
| 5,976,361 A | 11/1999 | Hood et al. |
| 6,183,627 B1 | 2/2001 | Friday et al. |
| 6,210,560 B1 | 4/2001 | Wiehe et al. |
| 6,274,003 B1 | 8/2001 | Friday et al. |
| 6,274,032 B2 | 8/2001 | Hood et al. |
| 6,357,526 B1 | 3/2002 | Abdel-Halim et al. |
| 6,524,469 B1 | 2/2003 | Schucker |
| 6,533,925 B1 | 3/2003 | Wallace et al. |
| 6,540,918 B2 | 4/2003 | Gil et al. |
| 6,972,085 B1 | 12/2005 | Brecher et al. |
| 7,297,250 B2 | 11/2007 | Bronicki |
| 7,381,320 B2 | 6/2008 | Iqbal et al. |
| 7,582,204 B2 | 9/2009 | Gueret et al. |
| 7,585,407 B2 | 9/2009 | Duyvesteyn et al. |
| 7,597,794 B2 | 10/2009 | Zhao et al. |
| 7,691,256 B2 | 4/2010 | Montanari et al. |
| 7,718,839 B2 | 5/2010 | Baumgartner et al. |
| 7,749,378 B2 | 7/2010 | Iqbal et al. |
| 7,758,746 B2 | 7/2010 | Yeggy et al. |
| 7,799,207 B2 | 9/2010 | Allinson et al. |
| 7,837,859 B2 | 11/2010 | Ou et al. |
| 7,867,385 B2 | 1/2011 | Yeggy et al. |
| 7,964,090 B2 | 6/2011 | Iqbal |
| 7,976,695 B2 | 7/2011 | Brecher |
| 8,048,291 B2 | 11/2011 | Subramanian et al. |
| 8,252,179 B2 | 8/2012 | Aoki et al. |
| 9,085,499 B2 | 7/2015 | Frey et al. |
| 2001/0002654 A1 | 6/2001 | Hood et al. |
| 2003/0019790 A1 | 1/2003 | Schucker |
| 2003/0089636 A1 | 5/2003 | Marchionna et al. |
| 2003/0129109 A1 | 7/2003 | Bronicki |
| 2004/0163996 A1 | 8/2004 | Colyar |
| 2006/0032789 A1 | 2/2006 | Bronicki |
| 2006/0272982 A1 | 12/2006 | Montanari et al. |
| 2007/0125686 A1 | 6/2007 | Zheng et al. |
| 2008/0083652 A1 | 4/2008 | Morel et al. |
| 2008/0093259 A1 | 4/2008 | Brecher |
| 2009/0101540 A1 | 4/2009 | Marchionna et al. |
| 2009/0166253 A1 | 7/2009 | Subramanian et al. |
| 2009/0166254 A1 | 7/2009 | Subramanian et al. |
| 2010/0243518 A1 | 9/2010 | Zimmerman et al. |
| 2010/0300931 A1 | 12/2010 | Barrero et al. |
| 2010/0300934 A1 | 12/2010 | Marchionna et al. |
| 2011/0005970 A1 | 1/2011 | Ou et al. |
| 2011/0017642 A1 | 1/2011 | Duyvesteyn |
| 2011/0028573 A1 | 2/2011 | Hassan et al. |
| 2011/0061298 A1 | 3/2011 | Frey et al. |
| 2011/0215030 A1 | 9/2011 | Corscadden |
| 2011/0266198 A1 | 11/2011 | Hassan et al. |
| 2013/0081325 A1 | 4/2013 | Corscadden et al. |
| 2013/0098735 A1 | 4/2013 | Corscadden et al. |
| 2013/0180888 A1 | 7/2013 | Corscadden et al. |
| 2013/0266556 A9 | 10/2013 | Medoff |

FOREIGN PATENT DOCUMENTS

| | | |
|---|---|---|
| CN | 1410510 A | 4/2003 |
| CN | 1485412 A | 3/2004 |
| CN | 1729275 A | 2/2006 |
| CN | 1891784 A | 1/2007 |
| CN | 101045872 A | 10/2007 |
| CN | 101952395 A | 1/2011 |
| GB | 795872 | 6/1958 |
| RU | 2124040 | 12/1998 |
| WO | WO 2007/103005 A1 | 9/2007 |
| WO | WO 2008/106765 A1 | 9/2008 |
| WO | WO 2010/060092 A2 | 5/2010 |
| WO | WO 2011/062737 | 5/2011 |
| WO | WO 2011/084564 A2 | 7/2011 |
| WO | WO 2011/106878 A1 | 9/2011 |
| WO | WO 2013/044346 A1 | 4/2013 |

OTHER PUBLICATIONS

Rhoe et al., "Visbreaking: A Flexible Process", Hydrocarbon Processing, Jan. 1979, pp. 131-136.

(56) References Cited

OTHER PUBLICATIONS

Golden and Barletta, "Designing Vacuum Units" (for Canadian heavy crudes), Petroleum Technology Quarterly, Q2, 2006, pp. 105-110.
R. Ulrich et al., "Application of the Rotating Disk Method to the Study of Bitumen Dissolution into Organic Solvents", Canadian Journal of Chemical Engineering, vol. 69, Aug. 1991.
Engineering ToolBox, "Ethane", no date.
ChemEd DL, "Viscosity", Dec. 16, 2010.
Thermodedia, "Pentane", Feb. 2, 2011.

\* cited by examiner

4- >55° from horizontal

Length "A"

2 - Middle Section – Mixing Chamber

3- Lower Section – Primary Clarification Zone

5 - >55° from horizontal

SEPARATION OF SOLID ASPHALTENES FROM HEAVY LIQUID HYDROCARBONS USING NOVEL APPARATUS AND PROCESS ("IAS")

FIELD OF THE INVENTION

Process intensification, simplification and improvement of open-art liquid-solid phase separator configurations are described in this specification for an improved solid asphaltene separator (IAS) device and method. The novel vessel arrangement and routing of fluids provides an effective, reliable and simple method for separating precipitated asphaltene solids from solvent/heavy hydrocarbon mixtures in a cost effective manner, suited for heavy hydrocarbon residue (the "Target Feedstock" for this invention) from any source such as Canadian Bitumen and particularly for Canadian Bitumen processed using Canadian Patent #2,764,676 (and U.S. patent application Ser. No. 13/351,767).

Solvent Deasphalting ("SDA") is a process employed in oil refineries and upgrading facilities to extract valuable components from residual oil often in an off-stream flow from a prior process operation. The extracted components resulting from this process can be further processed in refineries where they are cracked and converted into valuable lighter fractions, such as gasoline and diesel. Suitable residual oil "target feedstocks" which can be used in solvent deasphalting processes include, for example, atmospheric tower bottoms, vacuum tower bottoms, crude oil, topped crude oils, coal oil extract, shale oils, and oils recovered from oil sands, whether by mining or in situ recovery techniques.

Formalities

This application claims priority to US Provisional Patent Application Ser. No. 61/768,870.

DESCRIPTION OF PRIOR ART

Prior Art SDA Schemes

Solvent Deasphalting processes are well known and described, with many in the open-art, for instance, in Smith's U.S. Pat. No. 2,850,431, Van Pool's U.S. Pat. No. 3,318,804, King et al's U.S. Pat. No. 3,516,928, Somekh et al's U.S. Pat. No. 3,714,033, Kosseim et al's U.S. Pat. No. 3,714,034, Yan's U.S. Pat. No. 3,968,023, Beavon's U.S. Pat. No. 4,017,383, Bushnell et al's U.S. Pat. No. 4,125,458, and Vidueira et al's U.S. Pat. No. 4,260,476 all of which would benefit from further energy saving and performance enhancing features that reduce solvent to oil ratio and/or improve recovery of desired hydrocarbon products. Of note, none of these patents are suited for separating out an enriched hydrocarbon stream resulting in a precipitated essentially oil free solid asphaltene stream.

Treatment of SDA Generated Asphaltene-Rich Streams in the Prior Art

In U.S. Pat. No. 4,421,639 a SDA process uses a $2^{nd}$ asphalt extractor to concentrate asphaltene material (and recover more deasphalted oil or DAO). A concentrated asphalt stream with added solvent is sent through a heater which raises the stream's temperature to 425° F. at 18 psia, and is then sent to a flash drum and steam stripper to separate solvent (in this case propane) from the asphalt stream. Resulting asphalt in liquid form is pumped to storage. This arrangement only works if the asphalt rich stream is liquid at these conditions. It is burdened by plugging if any appreciable solid asphaltenes are present as would be the case in asphaltene-rich streams like bitumen and bitumen processed in Canadian Patent #2,764,676; and the process also has a high solvent volume requirement at industrial scales.

In U.S. Pat. No. 3,847,751, concentrated asphaltenes produced from an SDA unit are mixed with solvent and transported as a liquid solution into a spray dryer. The spray nozzle design and pressure drop in the dryer determines the size of liquid droplets that are formed. The goal in this dryer is to produce dry, non-sticky solid asphaltene particles from concentrated liquid asphaltene product and has no effect to separate out DAO from the concentrated liquid asphaltene. Cold gas is added to the bottom of the spray dryer to enhance cooling by additional convective and conductive heat transfer, as well as to increase droplet residence time by slowing droplet descent rate (via upward cooling gas flow) in order to reduce the size of the vessel (which otherwise would need to be extremely large to provide a long residence time while droplets dropped). This arrangement is not feasible if the asphaltene particles that have settled out in the extractor are in a solid form in the solvent at the process operating temperature. Solid particles plug the spray drier nozzle limiting reliability and thus viability of this scheme in solid asphaltene rich streams.

In U.S. Pat. No. 4,278,529, a process for separating a solvent from a bituminous material by pressure reduction without carry-over of bituminous material is disclosed. A feedstock in a fluid-like phase comprising bituminous material and solvent undergoes a pressure reduction process by passage through a pressure reduction valve and is then introduced into a steam stripper. The pressure reduction process vaporizes part of the solvent and also disperses a mist of fine bituminous particles in the non-vaporized solvent. The remaining asphaltene remains wet and sticky and has not enough solvent left to keep the heavy bituminous phase (with many solids) fluid. In other words, the stream does not maintain a flowable state and clumps of heavy bituminous particles are formed.

In U.S. Pat. No. 7,597,794, a dispersion solvent is introduced into a liquid asphalt stream after separation by solvent extraction, and the resulting asphalt solution undergoes rapid change in a gas-solid separator and is dispersed into solid particles and solvent vapor, resulting in low temperature separation of asphalt and solvent with the ability to adjust the size of the resultant asphalt particles. The challenge with flash/spray driers such as disclosed here using liquid solvent as a transport media is the propensity for the asphaltenes generated in the integrated process to remain wetted before, during and after a flash drying phase. In addition, with this integrated process, the asphaltene continues to be at elevated temperatures and thus remains liquid. This asphalt produced still includes a high level of heavy hydrocarbon. These asphaltenes stick to surfaces and foul and plug process equipment. The reduced reliability inherent in this approach makes such operations costly for heavy crudes with high asphaltenic content.

U.S. Pat. No. 4,572,781 (Krasuk) discloses a SDA process for separating substantially dry asphaltenes of high softening point (temperature) from heavy hydrocarbon material using a two stage co-current process with external mixers and a first stage centrifugal separator followed by a separate second stage decanter to separate a liquid phase from a highly concentrated slurry of solid asphaltenes in a one-way flow of slurry and solvent through the system. This process is designed to handle a rich asphaltene stream that has solid particles but is a highly costly process since the separation of the solids is done through a solid/liquid separation with additional solvent needed to make the material flow to the decanter. The solid material is still relatively wet once separated and needs a further drying step to recover solvent as a vapour. The recovered solvent vapour then needs to be condensed using supercritical separation above the solvent critical temperature for re-use, which is another high energy step adding cost and complexity. In addition, the operating temperature (15-60° C.) is well below the flow-able point for Heavy hydrocarbon residue (ex. Canadian Bitumen) unless the solvent to oil mass ratio is over 10:1, which would make the process very costly to build and operate.

Commercial SDA Schemes in Refining and Upgrading in the Prior Art

In U.S. Pat. No. 7,749,378, a ROSE (Residual Oil Super-critical Extraction) SDA process is applied to an atmospheric residue or vacuum bottoms residue stream within a refinery or Upgrader. The separated asphaltene-rich stream from the ROSE SDA unit is a liquid solution which is highly viscous and requires extreme operating conditions (high temperatures) and added solvent to facilitate feedstock flow through the process equipment. The targeted embodiment of the ROSE SDA process disclosed requires at least a 4:1 solvent to oil (residue) ratio (by mass) and operating temperatures of the extractor in the range of 300-400° F. In commercial practice of the targeted feedstock, the temperature must be even higher (reaching near critical conditions) or the solvent flow rate must be increased (up to 12:1 solvent to target feedstock ratio) in order to keep the asphaltene-rich stream from plugging the process equipment. Regardless, the patent requires the asphaltenes to necessarily remain dissolved in the liquid comprised of otherwise valuable heavy hydrocarbon components to work as intended. In this set up, a large portion of the original feedstock is downgraded from crude and sent to a low conversion (i.e. coker, gasification) or low value operation (asphalt plant) reducing the overall economic yield of the crude (in addition to the relatively high process intensity of the operation).

In U.S. Pat. No. 4,200,525, a liquid extraction process (known commercially as a "Karr" column) is described using counter-flowing liquid phases in a reciprocating plate extraction column in which the plates of the column are spaced with respect to one another approximately according to a preconfigured spatial relationship. The extraction column comprises a casing, a reciprocating shaft in the casing having perforated plates and, optionally, baffle plates mounted thereon in a spatial relationship with respect to each other and includes motive means and suitable cam and driving means to reciprocate the shaft.

In U.S. Pat. No. 2,493,265 a liquid-liquid extraction column (known commercially as a "Scheibel" column) is described comprising a substantially vertical column or chamber provided with a mixing section in which one or more agitators are installed to promote intimate contact between the liquids so as to approach equilibrium between them. Above and below the mixing chambers are fibrous packing that stops the circular motion of the liquids and permits them to separate.

The challenge with the co-current, mixer/settler processes in U.S. Pat. Nos. 4,200,525 and 2,493,265 is being able to run reliably with internal moving parts and achieving economic yields processing the target feedstock of heavy hydrocarbon residue (ex. Canadian Bitumen). These mixer/settlers when used industrially will only generate up to 85% of theoretical mass transfer stage due to back-mixing inefficiency. To achieve higher mass transfer efficiency increased mechanical force and smaller internal open areas are required which limits the concentration of solids in the column (<60%) that can be processed reliably precluding the use of these columns in processing the target feedstock (ex. Canadian Bitumen) that has high viscosity and has solids generated when in contact with solvent as in Canadian Patent 2,764,676.

In U.S. Pat. No. 4,101,415 a process is described that combines a traditional liquid-liquid extractor with a second stage liquid-solid separator. It is disclosed that the performance of a counter-current contactor can be improved by using a second separation stage to separate solid asphaltenes. It is clear that this separation is effected at high pressures (550 psig), high temperatures (over 500° F.) and high solvent to oil ratios of 40:1. At these conditions, separators will be extremely large. The process is oriented towards processing lube oil stocks with reduced fouling tendencies and is generally limited to low or moderate yields of deasphalted oil, negatively impacting the economics if applied to target feedstocks.

SUMMARY OF THE INVENTION

Figure 1:
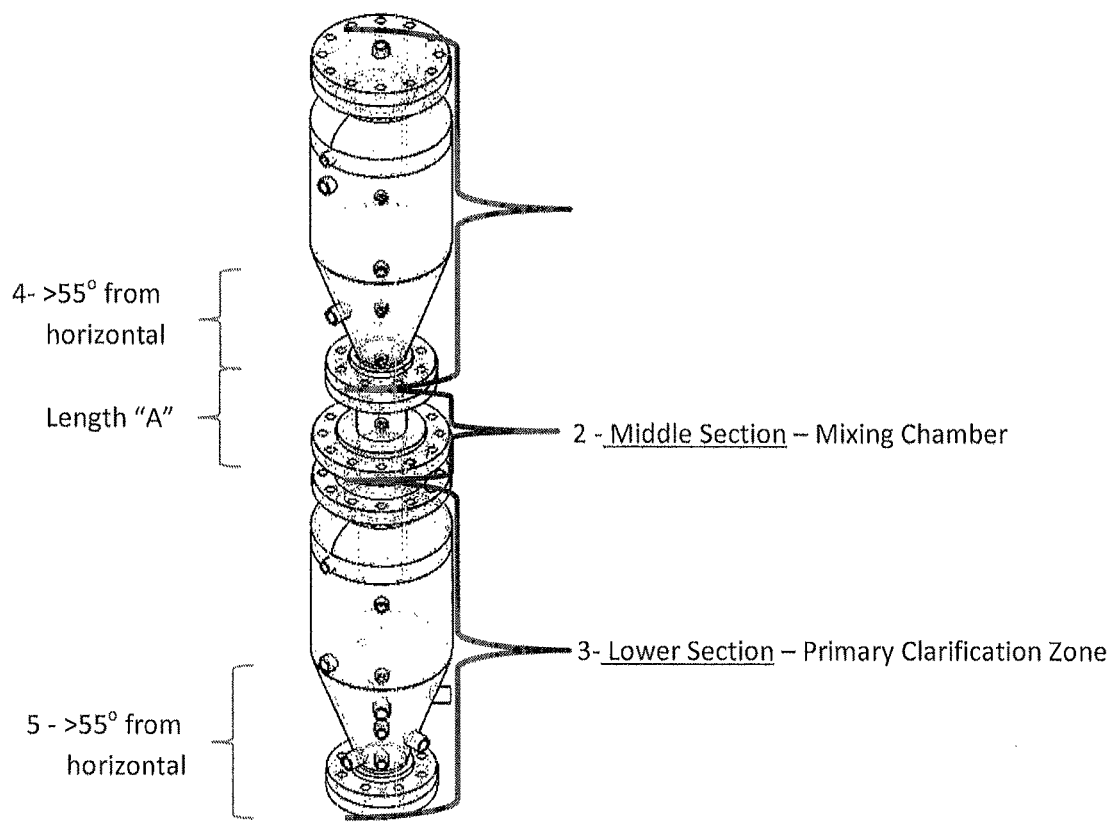
FIG. 1 depicts an illustrative 3-D view of an IAS vessel of this invention

It is to be understood that other aspects of the present invention will become readily apparent to those skilled in the art from the following detailed description, wherein various embodiments of the invention are shown and described by way of illustration. As will be realized, the invention is capable of being practiced with other and different embodiments and its several details are capable of modification in various other respects, all without departing from the spirit and scope of the present invention described here and limited by the claims. Accordingly the drawings and detailed description are to be regarded as illustrative in nature and not as restrictive.

An improved asphaltene separator (IAS) has been developed to support a continuous, reliable process to generate an essentially oil-free solid asphaltene by-product stream thus enabling a high DAO recovery and yield economically. The IAS with three sections and pumparound scheme provides the necessary separation, mixing, and counter-current mass transfer in a single vessel arrangement without the requirement for internal mass transfer or mixing devices. The vessel has specific geometry to mitigate the settling and plugging of solid asphaltenes in the vessel.

The proposed design has 3 distinct sections within one vessel providing specific process objectives to create an oil-free solid asphaltene without the need for internal mass transfer devices. The upper section is a primary DAO/solid asphaltene separation zone with asphaltene de-entrainment via temperature gradient above feed and up to one mass transfer stage via counter current flow below feed. The middle section injects fresh solvent for complete mixing with downward flowing solid asphaltenes while segregating the upper and lower sections by limiting the downward flow of essentially all the DAO from the upper section and simultaneously permitting downward travel of the solid asphaltenes through the middle section and into the lower section. The lower section is a primary clarification zone for the asphaltene solids with up to one mass transfer stage achieved from counter current upward flow of solvent introduced at the bottom of the lower section. With a preferred described vessel arrangement, fresh solvent injection points at the bottom of the lower section and at the middle section and a "pumparound" of solvent from the top of the lower section to the feed of the upper section to promote counter-current solvent flow within the system solvent interaction is maximized with the "Target Feedstock" reducing the overall solvent to oil ratio requirements.

By using a variety of lighter hydrocarbon mixtures as a solvent an essentially oil-free solid asphaltene stream can be generated in the proposed device and process scheme to create a high yield deasphalted oil (DAO) stream from a target feedstock like heavy asphaltene-rich hydrocarbon residue (ex. Canadian Bitumen).

Description of Various Embodiments

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practiced without these specific details.

Known methods of countercurrent liquid-liquid extraction of mixtures are generally of two types. The first type is designated as the batch countercurrent multiple contact method and employs a multiple of one-stage steps. It requires an apparatus consisting of a multiple of separate, external and alternate mixing and settling units connected by pipes and pumps to circulate the liquids. A pair of mixing and settling steps is known as a "stage" with solvent and separated components passing in opposite directions (counter current flow). In this arrangement, large quantities of equipment are required. Many pumps, tanks, agitators, mixers, and vessels with internals (static and mechanical) are needed requiring a lot of capital investment including a lot of plot space to operate. The second type is more readily practiced and is carried out by allowing the liquids to flow continuously and counter-currently in a chamber filled with various types of objects, whether static or mechanical, to provide better contact between a lighter rising liquid and a heavier settling liquid in the same chamber.

The concept illustrated in this patent application is a novel combination of the two types of liquid-liquid extraction methods to better suit the requirements of processing heavy asphaltene-rich crudes like the "Target Feedstock" (ex. heavy hydrocarbon residue and Canadian Bitumen) that have precipitated asphaltene solids in their process by providing a counter-current liquid-solid separator to recover more higher value hydrocarbons. The number of units is reduced when compared to the batch countercurrent method, and no internals (which are prone to plugging in this service) are needed through the use of a pumparound stream to maximize the use of solvent and maintain the crude within a specially designed three section single vessel. The design for the new separator is aimed to provide continuous, reliable operation providing a very high DAO recovery, with solid asphaltenes produced having a very low DAO content.

Mass transfer is a key design parameter for the process using the mixer 500 and the IAS and was determined to set the economic dimensions for the process using the mixer 500 and IAS and operating conditions to obtain acceptable levels of DAO recovery. Table 1 provides the relationship between mass transfer, noted as extraction stages, and the amount of DAO remaining as part of the solid asphaltenes when processing the "Target Feedstock". The mixer provides the first stage of mass transfer while the IAS provides two additional stages of mass transfer plus the required component separation.

TABLE 1

Asphaltene precipitation analysis

| Extraction Mass Transfer Stage # | Sample 1 | | Sample 2 | | Average | |
|---|---|---|---|---|---|---|
| | Asphalt. (vol %) | DAO (vol %) | Asphalt. (vol %) | DAO (vol %) | Asphalt. (vol %) | DAO (vol %) |
| 1 | 35.6 | 64.4 | 34.3 | 65.7 | 34.96 | 65.04 |
| 2 | 92.0 | 8.0 | 89.9 | 10.1 | 90.93 | 9.07 |
| 3 | 99.1 | 0.9 | 98.9 | 1.1 | 98.98 | 1.02 |

Based on testing as illustrated in table 1, and validation in a 5 BPD pilot plant, recovery of DAO above 99 wt % can be achieved which results in the DAO in asphaltene to be at most 5 wt %. To achieve the high recovery of DAO in this process, at least two to three stages of mass transfer may be needed. Essentially all of the recovered DAO is removed from the upper section with essentially all of the cleaned solid asphaltenes removed from the bottom of the lower section. In continuous operations multiple stages of mass transfer may be achieved economically in counter-current flow columns with the solvent travelling upward in the column in a plug flow nature, with increasing DAO concentration as it travels up the column. The IAS has three distinct sections, as shown in FIG. 1 providing over two mass transfer stages to meet the specific process objectives:
1. Upper Section—primary DAO/asphaltene separation zone at vessel inlet location
   a) At Inlet—separate near-equilibrium DAO/solvent solution and solid asphaltene in suspension from Mixer 500;
   b) Above inlet location—potential for asphaltene suppression to prevent carry over;
   c) Below feed location—mass transfer via counter current flow as the solid asphaltene settles from the suspension.
2. Middle Section—Inject fresh solvent for thorough mixing of downward flowing solid asphaltenes with clean solvent, mass transfer, and segregation of the rich DAO/solvent solution in the upper section from the lean DAO/solvent solution in the lower section while permitting asphaltene solids to drop from the upper to the lower section.

3. Lower Section—primarily a clarification zone—mass transfer via counter current upward solvent flow and downward asphaltene flow.

The upper section will separate the bulk of the DAO from the solid asphaltenes leaving up to approximately 10% of DAO in the DAO/asphaltene/solvent mix that settles to the mixing zone. This section of the IAS is configured so that the entering material has adequate volume to settle and separate into its respective "phases"/components (solvent/DAO solution and solid asphaltene precipitants in suspension) but without creating solvent mal-distribution. The lighter DAO/solvent mixture will travel upward with solvent introduced from the middle section and the heavier solid asphaltenes-rich suspension will settle downward through a solvent rich zone in this upper section.

An alternate embodiment of this upper section when less mass transfer is desired can be a typical hydrocyclone configuration for solid-liquid separation. Examples of possible hydrocyclone arrangements are U.S. Pat. Nos. 6,540,918 and 8,252,179B2 that describe separation of suspended solids from a liquid. A further alternate embodiment could be an enhanced liquid-liquid hydrocyclone as noted in U.S. Pat. No. 5,667,686 that could be applied to this solid-liquid separation.

Figure 2:
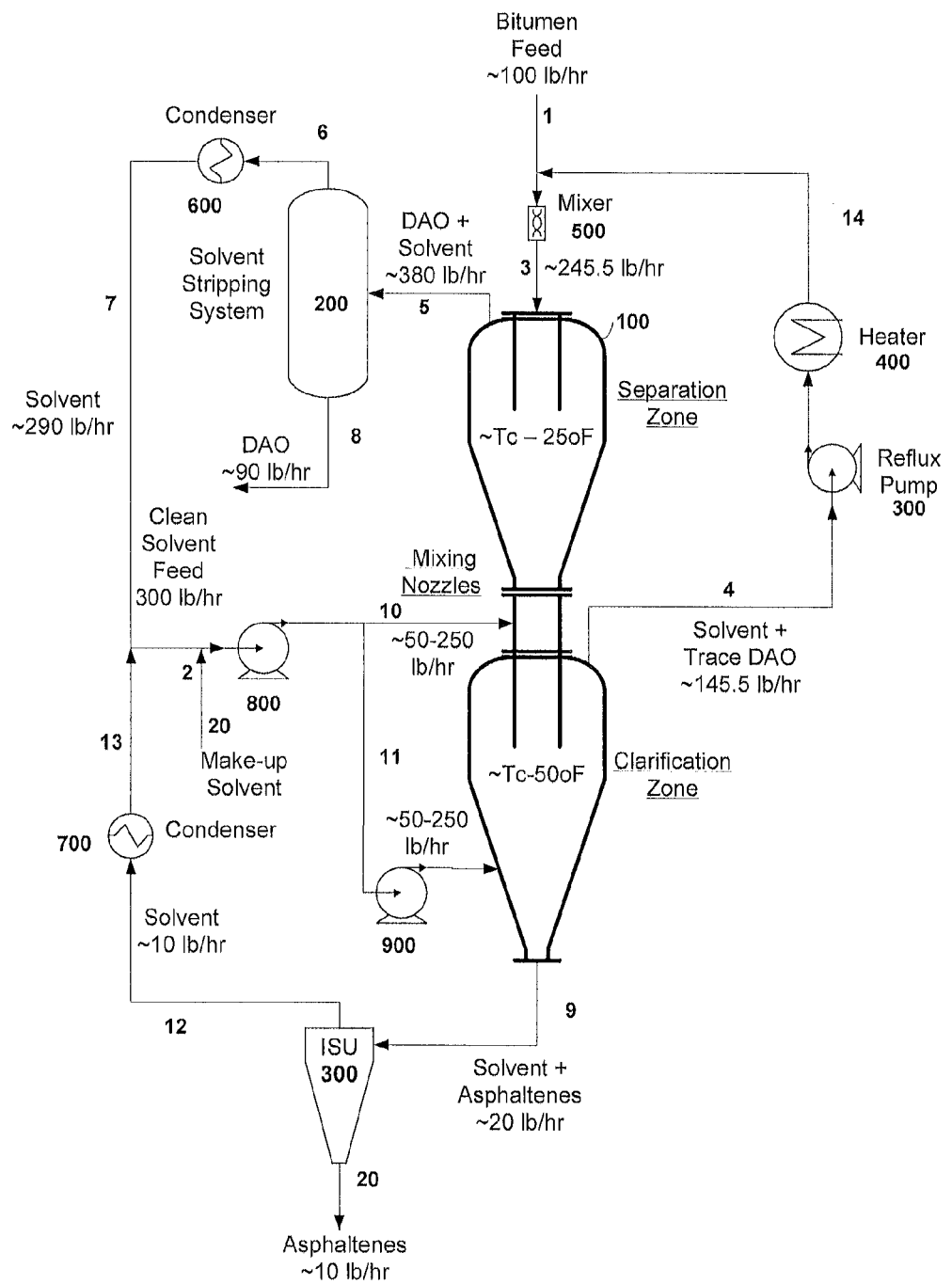
FIG. 2 depicts an IAS vessel of this invention with a top feed illustrating the pumparound zone including support solvent recovery vessels to improve the solvent deasphalting process with an inertial separator to enhance solid asphaltene segregation, according to one or more embodiments described.
Figure 3:
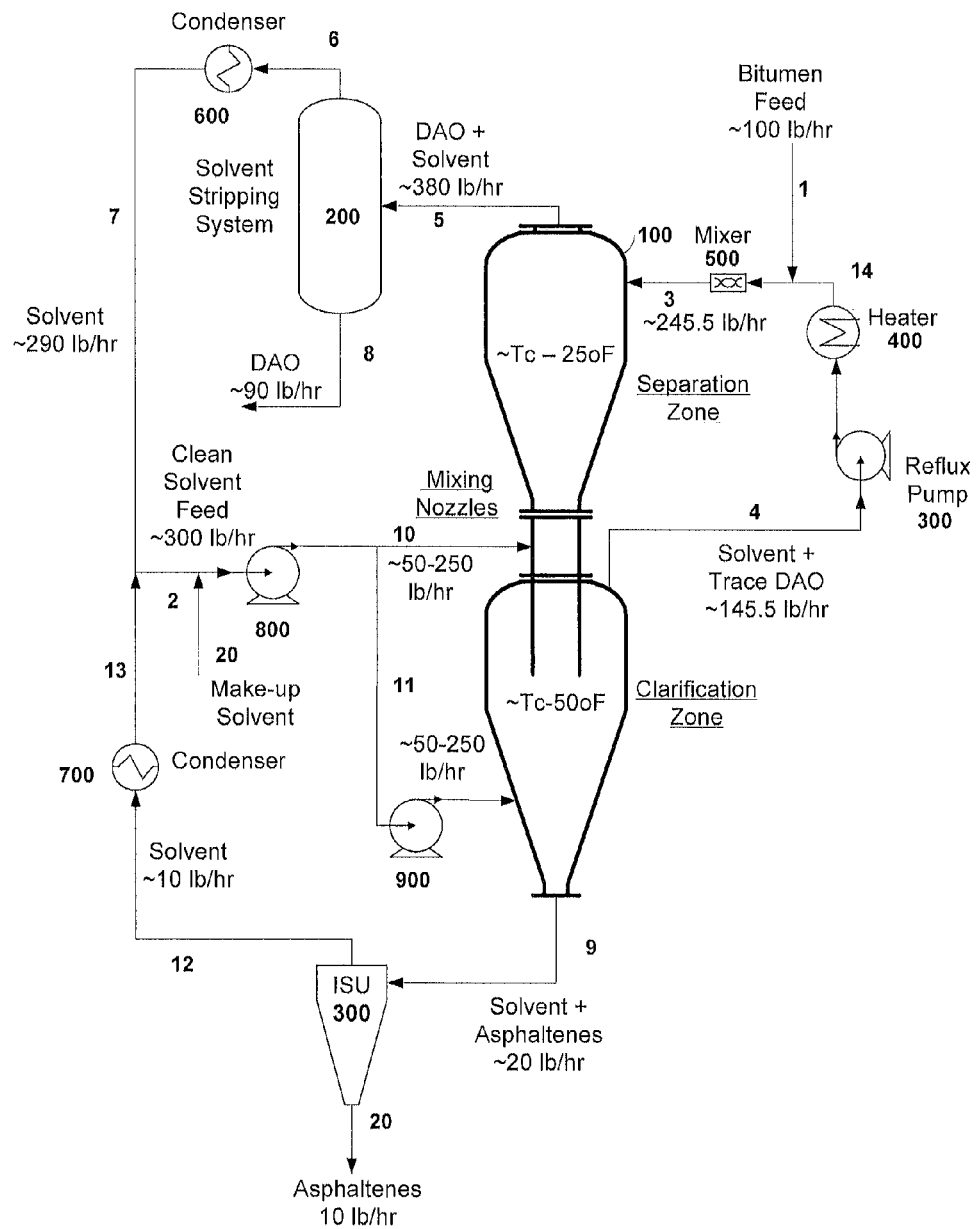
FIG. 3 depicts an IAS vessel of this invention with a top feed illustrating the pumparound zone including support solvent recovery vessels to improve the solvent deasphalting process with an inertial separator to enhance solid asphaltene segregation, according to one or more embodiments described.

As illustrated in FIG. 2, a benefit of a top (downward) inlet feed of a preferred embodiment is good axial distribution in the vessel for downward flowing feed with the upward flowing solvent. Another embodiment for the main target feedstock/solvent feed provides a side entry into the column (ex. direct or tangential), as shown in FIG. 3, which is a neutral entry locus that provides the fastest disengagement/separation of the two "phases"/components so the vessel can provide further mass transfer (below the feed) and asphaltene carryover suppression (above the feed). The design trade-off between top and side feed is the processing volume of the vessel required for mass transfer and distribution of the feed. A top feed will typically require more vessel height to achieve the same process objectives as a side feed without considering any additional internal devices.

For the side feed configuration, space in the vessel above the main feed is provided to allow for an upper temperature gradient which can be used to mitigate asphaltene carryover to the next section. The temperature gradient (~15-20° F.) is set to slightly reverse the solubility of the solvent so that the heavier components of the upward flowing DAO precipitate out and agglomerate with the solid asphaltenes so the solid asphaltenes are heavy enough to flow back downward. This internal flow cycle encourages agglomeration of smaller solid asphaltene particles into larger particles with sufficient mass to overcome the counter flow in order to travel back downwards toward the lower section.

The middle section can be configured with a single tangential or radial nozzle or several nozzles to provide thorough mixing and "washing" of the asphaltenes through the injection at those nozzles of clean solvent to further reduce the amount of DAO in the downward flowing solid asphaltene-rich mixture, and stop downward flow of DAO/solvent mixture from the upper section to the lower section while permitting the downward migration of precipitated asphaltene particles. The geometry of the vessel in this section and the nozzle orientation/placement provides optimal mixing with the solvent within this middle section. As a preferred embodiment noted in FIG. 4, three nozzles are arranged and sized to provide good solvent and solid asphaltene/DAO contact by mixing thereby reducing the overall solvent requirements since essentially all the solvent in this section is mixed with the downward flowing solid asphaltenes. In an embodiment, the design has no need for internal devices or projections that could reduce the overall effectiveness of the mixing zone by disrupting the flow patterns in the vessel and this reduces chances for fouling and material buildup. Mixing in this section aims to fully mix the downward flowing solid asphaltenes and any remaining small amounts of DAO with introduced solvent while still allowing the asphaltene solids to travel downward, while the counter-current upward solvent flow from the middle section to the upper section prevents downward migration of DAO from the upper section. The flow of solid asphaltenes downward via gravity can be tailored by modulating the volume and rate of introduced solvent in this section. Similarly, any downward flow of DAO/solvent mixture from the upper section can be controlled by the volume and rate of solvent introduced in the middle section.

This middle section provides further mass transfer and provides a counter current effect for solvent to contact downward flowing solid asphaltene and entrained DAO within the upper segment of the middle section. Contact with clean solvent in this mixing zone provides further DAO absorption in the upward flowing solvent. The diameter of this section is preferably smaller than the upper section (preferably less than 25% of the upper vessel diameter) so that solvent can be injected to ensure upward counter-current flows, and desired mixing and thus washing, without the need for any internal separation and solvent distribution devices. The length of this section is noted by A in FIG. 1 and can be anywhere from 3" to hundreds of feet in length.

Figure 4:
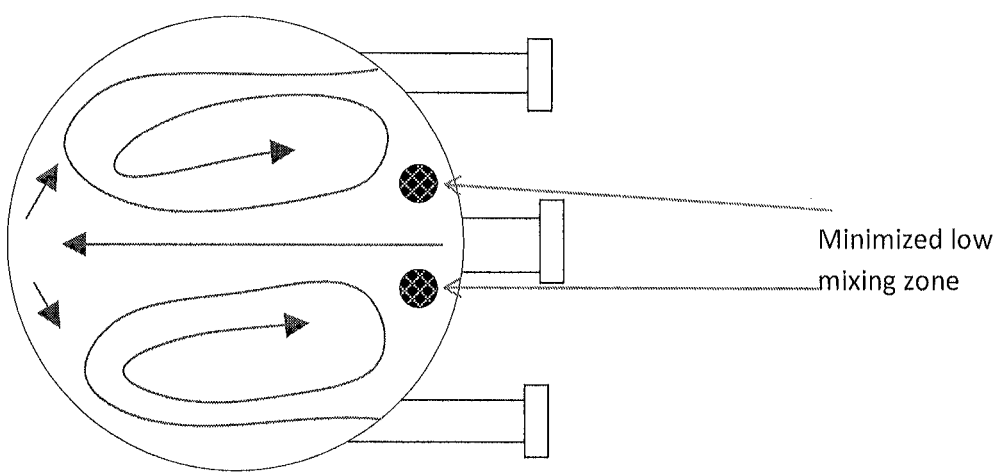
FIG. 4 depicts a preferred embodiment for the mixing zone and nozzles in the middle section of an IAS vessel of this invention.

FIG. 4 shows a conceptual arrangement of the injection nozzles in the washing zone of the middle section. Simple solvent flows at nozzle elevation are shown based on basic computational fluid dynamic (CFD) analysis. Three nozzles are used in an embodiment on one side of the vessel to create a well-developed, mildly turbulent mix of solvent with downward flowing solid asphaltenes. A simple valve manifold on one side of the vessel can be installed with appropriate flow meters and controls. There are minimal poor mixing zones, noted as filled in circles in FIG. 4.

The lower section of the IAS is essentially a clarification zone with asphaltene solids settling downward by gravity against an upward or counter-current (to the asphaltene solids) solvent flow. A larger diameter than the middle section is designed to tailor the settling velocity of the solids to be greater than the upward flowing velocity of introduced solvent to minimize upward flowing solid asphaltenes. Clarification zones in similar applications typically have long and wide sections to allow adequate time to settle the cleaned solids in a laminar flow. The clarification section is included to provide additional mass transfer with the solids settling rate being a crucial design parameter. Including the mass transfer from this section, the overall mass transfer for the mixer 500 and vessel 100 is greater than 2 stages.

Downward flowing solid asphaltene is fed into the lower section (from the upper section via the middle section) providing good axial distribution in the vessel for the downward flowing solid suspension in the upward flowing solvent. In an embodiment, nozzles are spaced in the conical portion of the lower section (clarification zone) to serve as solvent injection locations, from stream 11 in FIGS. 2 and 3, to limit solids agglomeration, bridging, and overall solid asphaltene accumulation in the bottom of the vessel, thereby ensuring mobilization of the solids.

All bottom portions of each section will either be a straight connection or should ideally have walls, as noted as sections 4 and 5 in FIG. 1, with angles of incline greater than 55° but preferably steeper, nearer 75° from horizontal to improve reliable operation. These angles allow for gravity to help reduce on-wall settling of particles and removes locations within the column where solids can accumulate.

FIG. 2 shows an application of the improved solid asphaltene separator (IAS) device unit 100, with a simple process flow diagram and mass balance around the three section vessel. A pumparound (reflux) configuration may be provided in a preferred embodiment to reduce the overall use of solvent with greater than two stages of solvent extraction/separation, and provides a novel and economic arrangement. Balancing solvent flows into and out of the lower section via the intake nozzles and the reflux outlet with solvent introduced in the middle section provides a means of modulating and controlling the solvent's upward, counter-current flow in the lower section. Similarly, adding relatively clean solvent, preferably taken from the lower section via the reflux circuit, to the middle of the upper section, and also controlling rates of introduced feedstock/ solvent blend and removing DAO/solvent mixture, with control of the fresh solvent volume introduced in the middle section provides a means of modulating and controlling the solvent's upward, counter-current flow in the upper section. These flow controls principally in the middle section act to segregate the DAO in the upper section from the lower section.

Based on the representative mass balance of FIGS. 2 and 3, the overall solvent to oil mass ratio (SOR) is 3:1 as noted in table 2a, in an embodiment. The local SOR's are 2.7 in the separation zone in the upper section, and 9.7 for both the mixing (middle section) and clarification (lower section) zones. Based on experimental results, as shown in table 2b, the SOR's can be in the 2.5-4 range for the separation zone in the upper section, in the 5-10 range for the mixing zone and in the 3-10 range for the clarification zone in the lower section. By using the pumparound and the dual injection concepts, the mixing and clarification SOR's can be substantially higher than the overall SOR while still having an overall low SOR for the entire process.

TABLE 2a

Representative Solvent to Oil (SOR) Mass Ratios

| | |
|---|---|
| Overall SOR (Entire Vessel) | 3 |
| Separation Zone (Upper Section) SOR | 2.7 |
| Mixing Zone (Middle Section) SOR | 9.7 |
| Clarification Zone (Lower Section) SOR | 9.7 |

TABLE 2b

Range of Solvent to Oil (SOR) Mass Ratios from experimental results

| | |
|---|---|
| Overall SOR (Entire Vessel) | 2.5-4 |
| Separation Zone (Upper Section) SOR | 2.5-4 |
| Mixing Zone (Middle Section) SOR | 5-10 |
| Clarification Zone (Lower Section) SOR | 3-10 |

Clean solvent in stream 2, collected from recovered solvent streams 6,7,12 and 13, is distributed to the 3 section vessel in two locations via stream 10 and 11. Clean solvent in stream 10 is injected at the second injection point into the mixing zone in the middle section while clean solvent from stream 11 is injected at the third injection point into the bottom of the clarification zone in the lower section creating counter current, upward solvent flow in the IAS vessel. Pumps 800 and 900 with the associated flowmeters and control valves (not shown) can be used to control the flows of solvent to the vessel as shown in FIG. 2. The stream 10 at the second injection point in the middle section breaks the single solvent/DAO gradient typically found in countercurrent column arrangements forcing a new DAO solubility limit (or equilibrium point) in the middle section and where DAO is better absorbed into the solvent in the bottom portion of the upper section of the vessel and thereby enhancing the mass transfer provided with this configuration. This flow also discourages downward flow of DAO from the upper section while permitting the solid asphaltenes to drop into lower section.

In an embodiment, the target feedstock of heavy hydrocarbon "oil" (i.e. heavy hydrocarbon residue (ex. Canadian Bitumen) or reactor bottoms from Canadian patent #2,764, 676 processing Canadian bitumen and similar processes) is fed through stream 1 and is mixed with the pumparound solvent in stream 14 which contains solvent and trace amounts of DAO from the lower section (clarification zone of the vessel) to wash any remaining DAO on or near the solid asphaltenes. In another embodiment, stream 1 can be mixed with clean or recycled/refreshed solvent, for example from stream 10.

The lean solvent from the clarification zone in the lower section from stream 4 is not fully saturated with DAO and can serve as an initial solvent for mixing with the Target Feedstock from stream 1. As stated above, clean solvent in stream 10 is added to replace the removed stream 4 pumparound solvent in the column to enhance mass transfer. The pumparound solvent stream 4 is passed through pump 300 and heater 400 to create the necessary operating conditions to promote complete mixing with the initial feed stream 1. A mixer 500, which can be a static or shear mixer, is employed to ensure complete mixing of feed stream 3 so the mixture can reach its solubility limit (equilibrium or close to 1 mass transfer stage) and thus generate solid precipitation of asphaltenes before entering the vessel 100.

A top feed entry for stream 3 is shown in FIG. 2, while a side feed entry for stream 3 is illustrated in FIG. 3. A rich DAO/solvent product leaves the top of the upper section of the vessel as stream 5 while the solid asphaltenes flow downward within the vessel to the middle mixing section where clean solvent from stream 10 is injected to promote mixing and washing of the downward flowing solid asphaltenes to remove remaining DAO. The introduction of solvent in the middle section is also designed to reduce downward flow of DAO/solvent mixture from the upper section while permitting downward movement of precipitated solid asphaltenes, by ensuring appropriate countercurrent flow of solvent.

The produced rich DAO/solvent stream 5 is sent to a solvent stripping unit 200 where DAO product stream 8 is produced along with a clean solvent stream 6. The solvent stripping unit can be a sub-critical separation in this arrangement due to the lower solvent volumes needed further reducing the overall cost for the process because less costly equipment material is needed due to the lower pressure flange classes used and because of reduced energy requirements. The solvent may be condensed in condenser 600 and then become liquid stream 7 for reuse in the process.

The middle section (mixing zone) with clean solvent from stream 10 will have an SOR of approximately 5-10:1. Upward flowing solvent from the mixing zone serves to induce counter current flow and a different solvent gradient in the upper section of the separator, and mixes with the feedstream 1, resulting in the upper section having an SOR of approximately 2.5-4:1. The solid asphaltenes continue falling downward through the middle section to the lower section's clarification zone.

Lean solvent with recovered DAO is removed at the top of the lower section (clarification zone), noted as stream 4, in an embodiment, using a pumparound to regulate flow so that the clarification zone in the lower section maintains an upward flow of solvent throughout but permits a downward flow of settling solid asphaltenes. The clarification zone SOR will in a preferred embodiment be in the range of 3.0-10:1. As noted previously, fresh solvent is added through stream 11, preferably in the conical portion of the lower section. Nozzles are placed in this conical portion to ensure thorough contact and distribution of the upward solvent flow with the downward flowing solid asphaltenes. The essentially oil-free solid asphaltene and some entrained solvent leave the lower section of the vessel as stream 9. In an embodiment, stream 9 enters a simple, low cost inertial separation unit (ISU) 300 to separate flashed solvent as stream 12, typically from a pressure reduction, to leave stream 20 a dry, solid particulate asphaltene. The solvent is condensed in 700, to create a liquid stream 13 that is mixed with stream 7 to serve as the clean recycled solvent feed stream 2. A slip stream of fresh make-up solvent 20 can be added to the process at stream 2 when needed.

Table 3 provides a performance comparison with an open art batch countercurrent liquid-liquid extraction (U.S. Pat. No. 4,572,781, Krasuk) generating a solid asphaltene by-product stream.

The invention of this application is better than what is illustrated under U.S. Pat. No. 4,572,781 by Krasuk et al (Krasuk). The DAO recovery is over 99%. In addition, the solvent use of this invention is 25% less than Krasuk and requires less equipment to accomplish better performance goals which typically results in a lower cost and more economically favourable process. The comparison in table 3 was done using the crude properties shown in table 4.

TABLE 4

Crude comparison

|  | 4,572,781 | Vessel 100 |
|---|---|---|
| Type | Jobo Crude | Athabasca Bitumen |
| Fraction | Atm, Residue | Whole |
| API | 6.7 | 7.3 |
| Sulfur, wt % | 3.6 | 4.98 |
| CCR, wt % | 16.1 | 14.7 |
| C7 Asphaltenes, wt % | 15.2 | 15.1 |
| C5 Asphaltenes, wt % | 19.4 | 20.98 |

The crude feedstock into Krasuk is actually a topped stream with the lighter crude fractions removed (whole Jobo crude API is ~9-11). The target feedstock for this invention, such as Athabasca bitumen, has more, heavier asphaltenes than Jobo. The API's and % asphaltenes are comparable between the two crude streams but the Athabasca asphaltenes are heavier and thus more difficult to process. It is probable that the Krasuk process would not be as effective in processing Athabasca bitumen as for topped Jobo crude due to the complexity of the Athabasca asphaltenes. Illustration A illustrates the difference in asphaltene structure between Athabasca bitumen and the Jobo crude used by Krasuk. Likely, the Athabasca based bitumen structure has more locations for DAO molecules to adhere to the asphaltene molecule making it more difficult to disengage the DAO to obtain desired DAO recovery. Even with a more difficult oil to process, vessel 100 and the process of this invention with the dual solvent injection and, in an embodiment, a pumparound stream provides a better DAO recovery with simpler equipment.

TABLE 3

Mass Balance comparison

| Stream | Stream 4,572,781 | Asphaltene Kg/hr | DAO Kg/hr | Hexane Kg/hr | TOTAL Kg/hr | Stream | Stream FIG. 2/3 | Asphaltene Kg/hr | DAO Kg/hr | Hexane Kg/hr | TOTAL Kg/hr |
|---|---|---|---|---|---|---|---|---|---|---|---|
| Feed | 1 | 12 | 88 | 0 | 100 | Feed | 1 | 12 | 88 | 0 | 100 |
| Solvent (from 2nd vessel) | 15 | 1 | 13.1 | 404.4 | 418.5 | Pumparound Solvent | 14 | 0.5 | 5 | 140 | 145.5 |
| Feed + solvent | 3 | 13 | 101.1 | 404.4 | 518.5 | Feed + pumparound solvent | 3 | 12.5 | 93 | 140 | 245.5 |
| 1st vessel overhead | 5 | 0.2 | 86.6 | 346.4 | 433.2 | Top section overhead | 5 | 2.5 | 87.5 | 290 | 380 |
| 1st vessel bottoms | 6 | 12.8 | 14.5 | 58 | 85.3 | Top section bottoms | N/A | 10 | 5.5 | 0 | 15.5 |
|  |  |  |  |  |  | Solvent to bottom of top section | 10 | 0 | 0 | 150 | 150 |
| Stripped Solvent to 2nd vessel | 10 + 11 | 0 | 0 | 361.3 | 361.3 | Solvent to bottom section | 11 | 0 | 0 | 150 | 150 |
| Feed to 2nd vessel | 13 | 12.8 | 14.5 | 419.3 | 446.6 |  |  |  |  |  |  |
|  |  |  |  |  |  | Stripped Solvent | 2 | 0 | 0 | 300 | 300 |
| 2nd vessel bottoms | 16 | 11.8 | 1.4 | 14.9 | 28.1 | Bottom section bottoms | 9 | 9.5 | 0.5 | 10 | 20 |
| DAO Product | 8 | 0.2 | 86.6 |  | 86.8 | DAO Product | 8 | 2.5 | 87.5 | 0 | 90 |
| Asphaltene Product | 20 | 11.8 | 1.4 | 0 | 13.2 | Asphaltene Product | 20 | 9.5 | 0.5 | 0 | 10 |
| Solvent:Oil Mass Ratio |  |  | 4.0 |  |  | Solvent:Oil Mass Ratio |  |  | 3.0 |  |  |
| % DAO Recovery |  |  | 98.4 |  |  | % DAO Recovery |  |  | 99.4 |  |  |

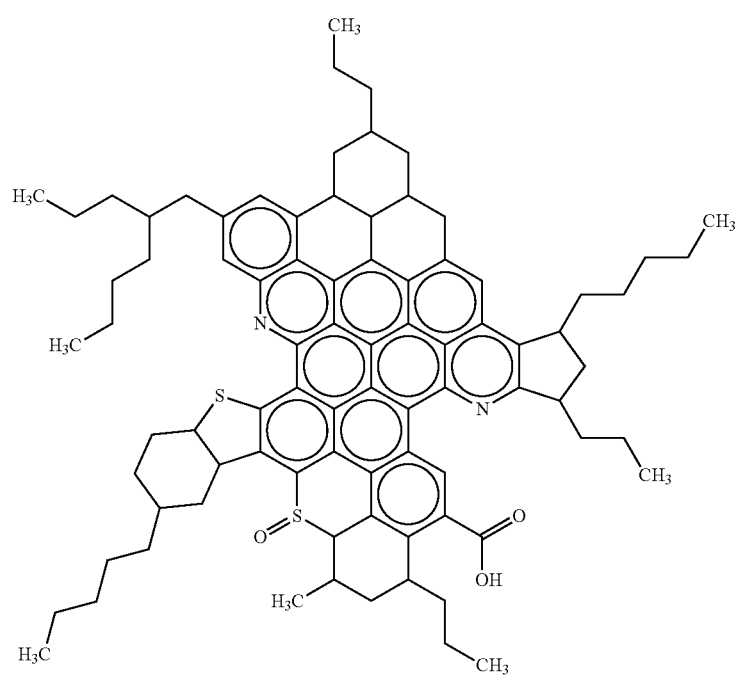
A
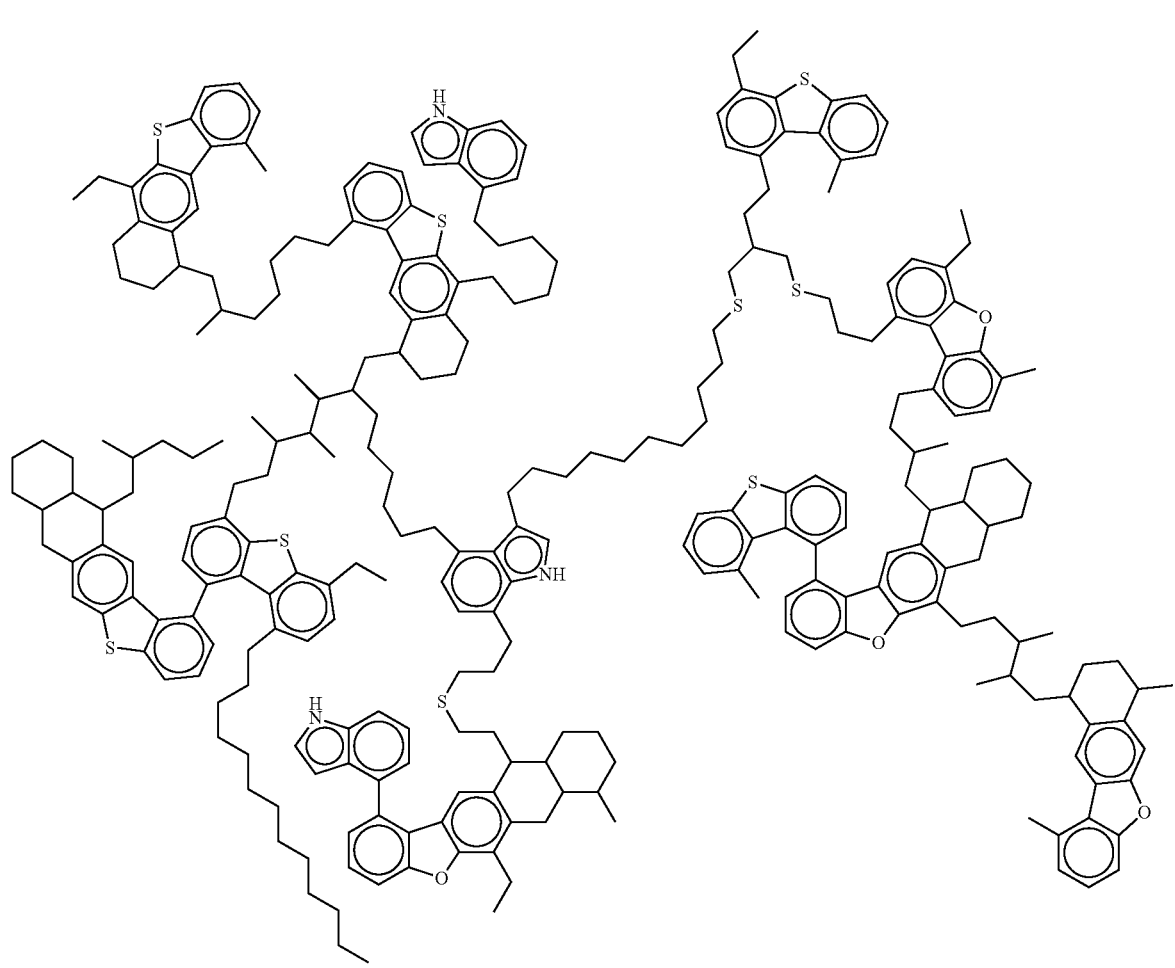
B
Illustration A - Average molecular structures representing asphaltene molecules from different sources: A, asphaltenes from heavy Venezuelan crudes (like Jobo); B, asphaltenes from Canadian bitumen (Sheremata et al., 2004).

Krasuk described a process which as its end-product delivered dry asphaltene solids with, as in his best example, >10% included DAO by weight. This invention is capable of delivery of dry asphaltene solids with very small particle sizes and with included DAO of under 5 wt %. The solid asphaltenes delivered are therefore quite different in their characteristics, and in addition, the invention of this application delivers an increased volume of valuable DAO hydrocarbons removed from the precipitated asphaltenes.

Krasuk's process describes a sequence of two segregated solvent washes operating co-currently. This means that the Krasuk invention with the two segregated washes has more pumping complexity, uses much more fresh solvent, and much differently configured/sized sequential wash vessels, and results in a solid asphaltene product with different characteristics (higher included DAO and consequential handling and economics), and less overall liquid hydrocarbon recovery.

A further embodiment of the IAS vessel of this invention with pumparound arrangement when processing Target Feedstock hydrocarbon residue (ex. Canadian Bitumen) is to be integrated with an upstream thermal cracking operation such as described in U.S. Pat. No. 7,976,695 and as illustrated in Canadian Patent #2,764,676. The concentration of solid asphaltenes in the feed to the mixer 500 in front of the IAS in this preferred embodiment can be 33.5% (to approximately as high as 50%) with the feed stream 1 (having an API in the −2 to 5 range after the lighter portions of the bitumen have been separated in the upstream thermal cracker). These ranges of acceptable asphaltene concentrations in the Target Feedstock are approximately 3 times more than allowed or discussed in the Krasuk feed. The DAO recovery is as good as the Krasuk invention with less DAO left in the produced solid asphaltene and has essentially the same solvent to oil ratio while processing a heavier and more asphaltene-rich feedstock. In addition, the operating conditions for the Krasuk patent would prevent the target feedstock of this invention from flowing in and through the vessels of Krasuk. The IAS and pumparound arrangement successfully processes this target feedstock as noted in table 5.

TABLE 5

Thermally affected Canadian Bitumen bottoms processed through IAS with pumparound (recorded in 5 BPD pilot plant).

| Stream | Stream | Asphaltene Kg/hr | DAO Kg/hr | Hexane Kg/hr | TOTAL Kg/hr |
|---|---|---|---|---|---|
| Feed | 1 | 33.5 | 66.5 | 0.0 | 100.0 |
| Pumparound Solvent | 14 | 2.7 | 2.7 | 300.0 | 305.4 |
| Feed + pumparound solvent | 3 | 36.2 | 69.2 | 300.0 | 405.4 |
| Top section overhead | 5 | 2.7 | 65.4 | 391.9 | 460.0 |
| Top section bottoms | N/A | 33.5 | 1.1 | 0.0 | 34.6 |
| Solvent to bottom of top section | 10 | 0.0 | 0.0 | 297.3 | 297.3 |
| Solvent to bottom section | 11 | 0.0 | 0.0 | 108.1 | 108.1 |
|  |  | 0.0 | 0.0 | 0.0 | 0.0 |
| Stripped Solvent | 2 | 0.0 | 0.0 | 405.4 | 405.4 |
| Bottom section bottoms | 9 | 30.8 | 1.1 | 13.5 | 45.4 |
| DAO Product | 8 | 2.7 | 65.4 | 0.0 | 68.1 |
| Asphaltene Product | 20 | 30.8 | 1.1 | 0.0 | 31.9 |
| Solvent:Oil Mass Ratio |  |  | 4.1 |  |  |
| % DAO Recovery |  |  | 98.4 |  |  |

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

Definitions

The following terms are used in this document with the following meanings. This section is meant to aid in clarifying the applicant's intended meaning.

A slurry is, in general, a thick suspension of solids in a liquid.

In chemistry, a suspension is a heterogeneous fluid containing solid particles that are sufficiently large for sedimentation. Suspensions are classified on the basis of the dispersed phase and the dispersion medium, where the former is essentially solid while the latter may either be a solid, a liquid, or a gas.

In chemistry, a solution is a homogeneous mixture composed of only one phase. In such a mixture, a solute is dissolved in another substance, known as a solvent.

An emulsion is a mixture of small globules of one liquid into a second liquid with which the first will not dissolve.

Precipitation is the process of separating a substance from a solution as a solid.

Process intensification is the replacement or combination of separate operating units into one unit improving the overall performance of the process. Similarly, process intensity expresses a relative concept for comparing a combination of complexity, capital intensity and operational expense factors for processes or facilities.

Canadian Bitumen is a form of petroleum that exists in the semi-solid or solid phase in natural deposits. Bitumen is a thick, sticky form of crude oil, having a viscosity greater than 10,000 centipoises under reservoir conditions, an API gravity of less than 10° API and typically contains over 15 wt % asphaltenes.

Some Liquid-Liquid Extraction Terms:

Continuous Phase—The continuous phase is one of the two immiscible phases in an extraction tower. The continuous phase flows through the extractor as a continuum, rather than as dispersed droplets. In our process, the solvent should be considered the continuous phase and flows upwards.

Dispersed Phase—The dispersed phase is one of the two immiscible phases which are contacted in an extraction tower. It flows through the extractor as droplets purposely dispersed in the second (continuous) phase.

Entrainment—Entrainment refers to the presence of droplets of one of the liquid phase (in this case solid asphaltenes) in the other phase after a separation zone in the tower. Two critical separation zones are the upper and the lower of the column, where the two phases disengage before leaving the column.

Equilibrium contact—means to promote intimate contact between the liquids.

Extract—The extract is the stream leaving an extraction tower which consists of solvent and the compounds (DAO) extracted from the feed by the solvent. It is also known as rich solvent. It may also be referred to as the "extract solution" to differentiate it from the "extract product" which is produce by separating the solvent from the extracted components in a secondary separation step (i.e. two-stage stripping).

Raffinate—The raffinate is the stream leaving an extraction tower which consists of the feed components not extracted by the solvent (i.e. asphaltenes and residual DAO).

Theoretical Stage—A theoretical stage is the equivalent of a single contacting zone in which the concentrations in the liquid (and solid) phases leaving the zone are in equilibrium.

Flooding—Flooding is a condition caused by the operation of the extraction tower at dispersed or continuous phase flow rates exceeding the capacity of the column. Typically, flooding is evidenced by a significant buildup of dispersed phase within the extractor and/or by excessive entrainment.

Mass transfer—Mass transfer is the spontaneous, irreversible transfer of mass of a given component in a space with a nonuniform field of chemical potential of the component.

Mass Transfer Stage—A mass transfer stage is a discrete point where mass transfer occurs to approach equilibrium. Multiple stages can be continuously coupled to reach a desired separation quality.

Washing—Washing is the thorough contact of solvent to remove DAO that surrounds asphaltene solid particles.

The invention claimed is:

1. An Improved Asphaltene Separation process, comprising the steps:
   a. A target feedstock is mixed with a Solvent;
   b. The feedstock/solvent mix is introduced near to the top of a Separator having three parts in fluid communication, spaced vertically:
      i. An upper section
      ii. A middle section, and
      iii. A lower section;
   c. Fresh solvent is introduced to the middle section;
   d. Fresh solvent is introduced to the lower portion of the lower section;
   e. A DAO-rich solvent/DAO solution is removed from near the top of the upper section; and
   f. A slurry of particulate asphaltene solid precipitate and solvent is removed at an outlet near or at the bottom of the lower section
   g. The removed slurry of particulate asphaltene solid precipitate and solvent is processed in a low temperature inertial separator unit (ISU) creating a dry solid asphaltene stream and a recovered solvent stream; and
   h. The DAO-rich solvent/DAO stream is sent to a stripping unit to create a product DAO stream and a recovered solvent stream.

2. The process of claim 1 where movement of the asphaltene solid precipitate through the Separator is modulated by controlling solvent flows:
   a. In the upper section where there is sufficient solvent/mixture interaction to provide substantial removal of DAO from the precipitate, movement of the precipitant is controlled by balancing solvent inflow of the feedstock/solvent mix and clean solvent from the middle section against the solvent outflow in the DAO-rich solvent/DAO removal while permitting the precipitated asphaltene solid particles to drop by gravity through the upper section to the middle section;
   b. In the middle section, solvent is added with sufficient volume, force and directed flow to:
      i. Provide some upward flow of clean solvent into the upper section, sufficient to discourage downward flow through the middle section of DAO/solvent mixture while insufficient to discourage downward movement through the middle section of solid asphaltene precipitate particles;
      ii. Provide thorough mixing in the middle section of clean solvent with downward falling solid asphaltene precipitate particles; and
      iii. Provide solvent inflow to the lower section co-current with the dry solid asphaltene particles; and
   c. In the lower section, solvent is added near the bottom of this section with sufficient volume to control some counter-current solvent flow in a solid asphaltene slurry formed as the solid asphaltene precipitate particles fall to the bottom of the process vessel, and to provide enough solvent to enable the slurry to be produced from the outlet at or near the bottom of the lower section of the vessel.

3. The process of claim 1 with a controlled outflow through an outlet in the upper sidewall of the lower section for removal of lean solvent from the lower section.

4. The process of claim 2 with the added flow control step of also controlling the outflow of lean solvent from the lower section.

5. The process of claim 2 where opportunities for mass transfer to remove DAO from solid asphaltene precipitate are increased by providing increased solvent/solid contact, which is done by controlling:
   a. Mixing effects in the middle section by controlling at least one of: solvent in-flow volumes, force or direction;
   b. Mixing effects in the vessel by controlling counter-current solvent flows; and
   c. Duration of washing of asphaltene particles by solvent by controlling solvent flows and counter-flows, and asphaltene downward drop rates through the vessel.

6. The process of claim 1 in which as a result of the mixing of target feedstock and solvent at step (a), a dry asphaltene solid is precipitated so that the feedstock/solvent mix introduced to the Separator at step (b) comprises:
   a. Solvent/DAO solution;
   b. Solid asphaltene suspension.

7. The process of claim 3, where solvent used to mix with the target feedstock is taken from the controlled outlet that removes lean solvent from an upper part of the lower section and that lean solvent is introduced to the target feedstock prior to the mixture entering the separator.

8. The process of claim 3, where a lean solvent mixture comprised of DAO recovered from the precipitate in the lower section and solvent is recovered at or near the top of the lower section and that lean solvent is introduced to the target feedstock prior to the mixture entering the separator.

9. The process of claim 1 where the solids settling rate is such that <10 wt % of the solid asphaltene in the target feedstock is entrained with the DAO-rich solvent/DAO product through the middle section.

10. The process of claim 1 where the overall mass solvent to oil ratio is <4:1.

11. The process of claim 1 where the Solvent to oil ratio in the separation zone of the upper section is <4:1.

12. The process of claim 1 where the Solvent to oil ratio in the mixing zone in the middle section is <10:1.

13. The process of claim 1 where the Solvent to oil ratio in lower zone is <10:1.

14. The process of claim 1, where the % DAO in the lean solvent of the pumparound stream is <1.0%.

15. The process of claim 1 where the % DAO in the solid product asphaltene is less than 5 wt %.

* * * * *